United States Patent [19]

Black

[11] Patent Number: 4,604,045
[45] Date of Patent: Aug. 5, 1986

[54] MOLD MOUNTING AND RELEASABLE CLAMP THEREFOR

[75] Inventor: John W. Black, Hickory Corners, Mich.

[73] Assignee: Standex International Corporation, Salem, N.H.

[21] Appl. No.: 659,377

[22] Filed: Oct. 10, 1984

[51] Int. Cl.[4] .................................... B29C 45/06
[52] U.S. Cl. ................................ 425/575; 425/182; 425/576; 425/453
[58] Field of Search ............... 24/69 SK, 70 SK, 494; 269/228; 425/453, 574, 576, 182, 575

[56] References Cited

U.S. PATENT DOCUMENTS 2,649,632  8/1953  Kessler ........................ 269/228
4,424,015  1/1984  Black et al. .................. 425/576

Primary Examiner—Jay H. Woo
Assistant Examiner—Timothy W. Heitbrink
Attorney, Agent, or Firm—Flynn, Thiel, Boutell & Tanis

[57] ABSTRACT

A mold housing support apparatus for supporting a mold housing having a mold cavity therein. A pair of laterally spaced elongate support members are secured at one end to a base structure which in the illustrated embodiment is a sector to a table. Each support member is cantilevered horizontally outwardly from the base structure and has an upwardly facing support surface coplanar with the other. An upstanding guide wall is also provided on each of the support members and is oriented so that the support surfaces are oriented therebetween and the guide walls diverge in a direction away from the base structure. A mold housing is mounted on a mold housing support plate with lateral edges that extend parallel to the guide walls on each of the support members. A toggle lever structure is provided for fixedly securing the mold housing support plate and, thence the mold housing to the base structure.

1 Claim, 5 Drawing Figures

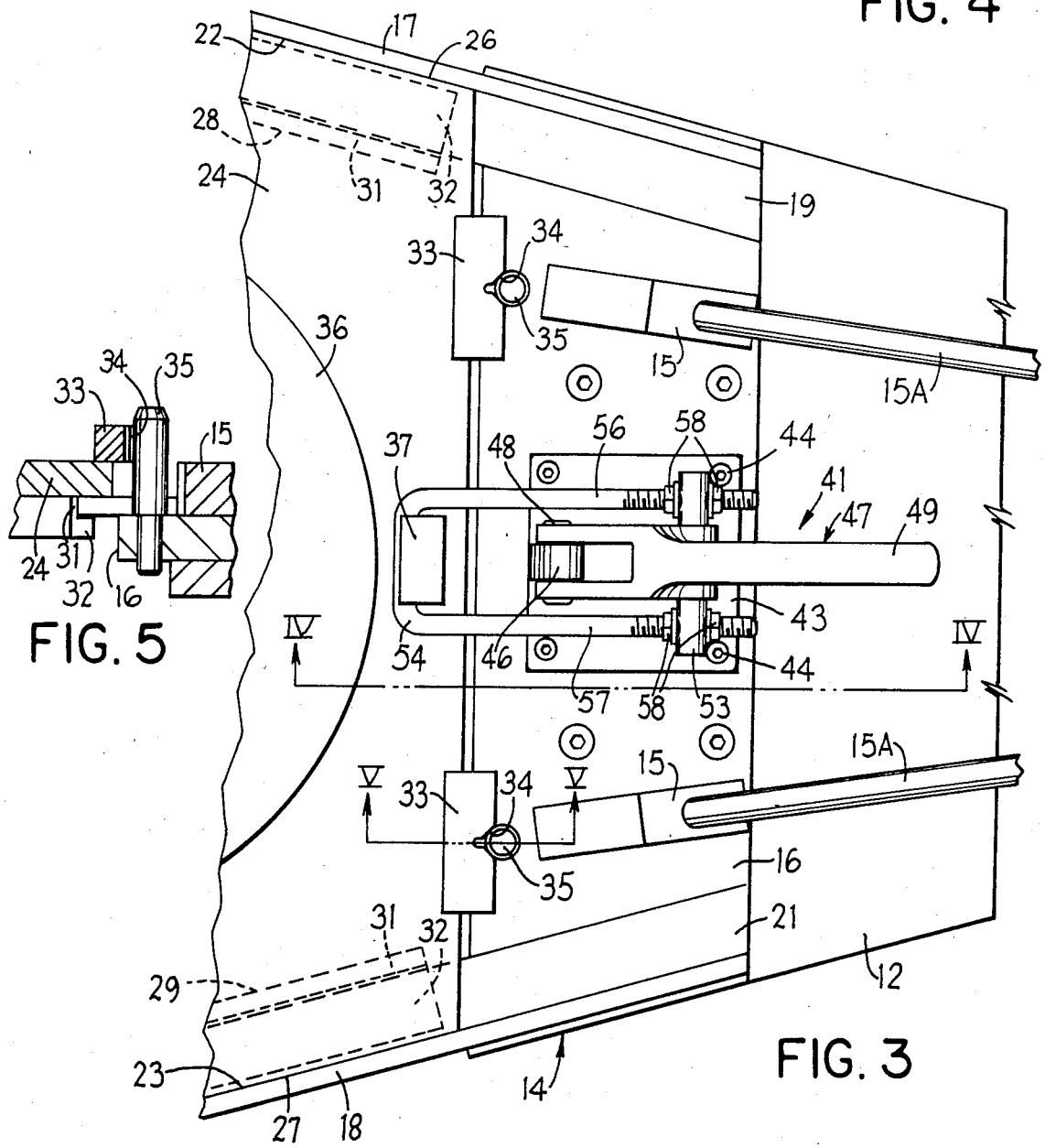

MOLD MOUNTING AND RELEASABLE CLAMP THEREFOR

FIELD OF THE INVENTION

This invention relates to a mold housing support apparatus and, more particularly, a mold housing support apparatus adapted to be cantilevered outwardly from a base to enable an easier installation and removal of a mold housing from the base structure.

BACKGROUND OF THE INVENTION

In molding operations wherein a plurality of mold housings are mounted onto a turntable and sequentially moved past an injection molding station, it is oftentimes necessary to provide a different mold housing having a different shaped mold cavity therein to enable the production of a multitude of different components on the same turntable. In one known molding operation, a plurality of different mold housings can be mounted on one and the same turntable with appropriate control circuitry being utilized to control the magnitude of the injection so that a filling of the mold cavity will be assured. U.S. Pat. No. 4,424,015, assigned to the same assignee as the present invention, illustrates one such device capable of accomplishing the aforementioned objectives.

However, it has become necessary to handle the mold housings at an increasing frequency. The structures heretofore known for securing the mold housing to the base structure supporting same has required a considerable amount of time to accurately position the mold on the base support structure as well as remove same therefrom. Accordingly, it is desirable to provide a structure which will enable the quick demounting as well as mounting of a mold housing onto a base support structure.

Accordingly, it is an object of this invention to provide a mold housing support apparatus mounted on a base and enabling the quick mounting and demounting of a mold housing with respect thereto.

It is a further object of this invention to provide a mold housing support apparatus, as aforesaid, wherein the base includes a pair of laterally spaced elongate support members horizontally outwardly cantilevered from the base so that when the mold is mounted thereon, both the top and bottom surfaces of the mold will be exposed.

It is a further object of this invention to provide a mold housing support apparatus, as aforesaid, which includes toggle lever means for enabling a quick connect and quick disconnect of the mold housing to the base structure.

It is a further object of this invention to provide a mold housing support apparatus, as aforesaid, wherein the toggle lever structure will effect a movement of the mold housing to a position whereat the inlet to the mold cavity will be appropriately aligned with an injection nozzle structure on an injection molding machine.

SUMMARY OF THE INVENTION

In general, the object and purposes of the invention are met by providing a mold housing support apparatus for supporting a mold housing having a mold cavity therein. The mold housing support apparatus includes a base structure upon which a pair of laterally spaced and elongate support members are mounted and cantilevered horizontally outwardly therefrom. The support members each have an upwardly facing support surface coplanar with the other and an upstanding guide wall oriented so that both of the support surfaces are located therebetween. The guide walls are further oriented to diverge in a direction away from the base structure. The mold housing has a bottom wall and opposed sidewalls conformed to the diverging direction of the guide walls. That is, the opposed sidewalls on the mold housing converge in a direction, when the mold housing is oriented adjacent the base structure and between the support members, toward the base structure parallel to the upstanding guide walls. An upstanding hook structure is fixedly mounted on either the mold housing or the base structure and appropriate toggle lever structure is fixedly mounted on the other of the mold housing and the base structure. The toggle lever structure includes a pair of pivotally related levers with one having structure thereon adapted to engage the hook. The other lever is pivotally supported to either the mold housing or the base structure and adapted to move away from the appropriate one of the mold housing or the base to draw the mold housing and the base together and fixedly orient the mold housing so that the inlet thereto will be appropriately aligned with the injection nozzle on an injection molding machine.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 3 is an enlarged top view of the toggle lever structure;

FIG. 4 is a sectional view taken along the line IV—IV of FIG. 3; and

FIG. 5 is a sectional view taken along the line V—V of FIG. 3.

DETAILED DESCRIPTION

Figure 1:
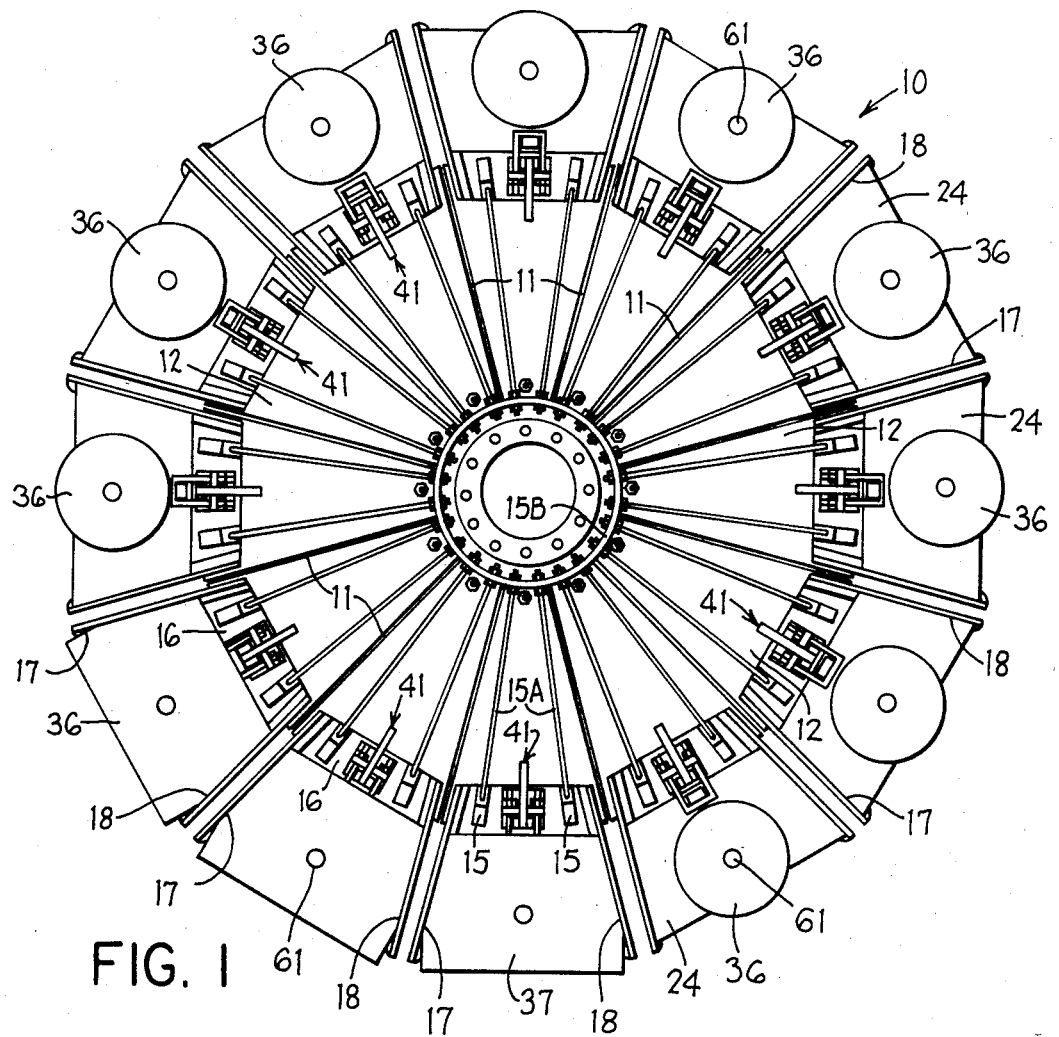
FIG. 1 is a top view of a turntable having thereon plural mold housing support apparatus embodying the invention.

FIG. 1 illustrates a view that is similar in many respects to FIG. 1 of U.S. Pat. No. 4,424,015. The primary difference between the structure illustrated in FIG. 1 of U.S. Pat. No. 4,424,015 and FIG. 1 of the present disclosure is the manner by which the mold housings are supported on a base structure. Therefore, for further details of the base structure, reference is to be made to the aforementioned U.S. Pat. No. 4,424,015.

As shown in FIG. 1, the table 10 has a plurality of radially extending slots 11 which divide the table 10 into a plurality of sectors 12. In this particular embodiment, there are twelve such sectors. As the table 10 is rotated in discrete steps, each of the sectors 12 is successively positioned at twelve predetermined locations.

Figure 2:
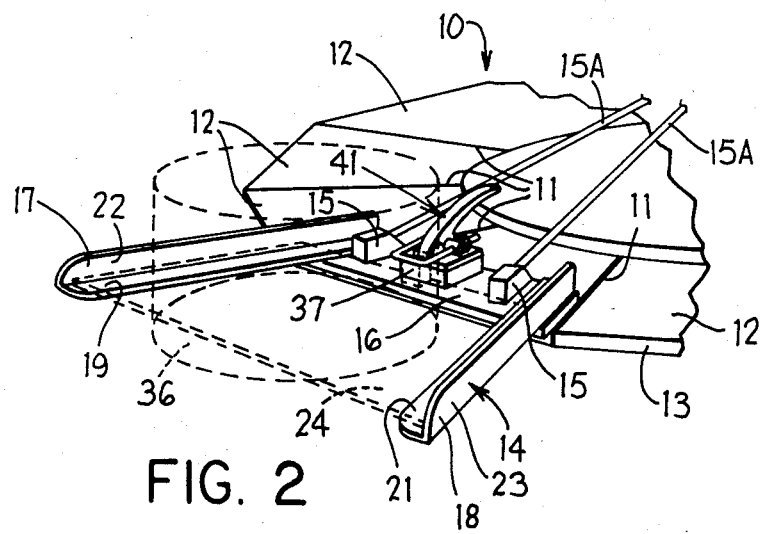
FIG. 2 is a fragmentary perspective view of the mold housing support apparatus.

Each sector 12 has adjacent a peripheral edge 13 thereof a support structure 14 (FIG. 2) fixedly secured thereto. The support structure 14 includes a plate 16 secured to and extending laterally across the width of the sector 12 adjacent the peripheral edge 13. A pair of mounting blocks 15 are secured to the plate 16 at laterally spaced locations. Plural support rods 15A are provided for supporting the weight of each table sector 12. Each support rod 15A extends between and is connected to a mounting block 15 and a cylindrical hub 15B. Adjacent each of the ends of the plate 16 there are provided a pair of elongate support members 17 and 18 which are generally L-shaped in cross section. Each of these support members is secured at one end thereof to the plate 16 and are cantilevered horizontally outwardly from the plate 16. In this particular embodiment, each of the support members 17 and 18 has an upwardly facing support surface 19 and 21, respectively, which are coplanar with each other. Each of the support members 17 and 18 further have an upstanding guide wall 22 and 23, respectively, oriented so that both of the support surfaces 19 and 21 are located between the upstanding guide walls 22 and 23. As illustrated in FIGS. 1 and 2, the support members 17 and 18 are oriented to diverge in a direction away from the plate 16. In this particular embodiment, the support members 17 and 18 extend parallel to the mutually adjacent slot between the mutually adjacent sectors 12 of the table 10.

A mold housing support plate 24 is provided and has lateral edges 26 and 27 which extend parallel to the guide walls 22 and 23, respectively. In this particular embodiment, the lateral edges 26 and 27 of the support plate 24 will engage the guide walls 22 and 23 when the support plate 24 slightly overlaps the plate 16 secured to the appropriate one of the sectors 12 as illustrated in FIG. 4.

If desired, a pair of laterally spaced guide brackets 28 and 29 may be secured to the underside of the support plate 24. More specifically, the brackets 28 and 29 may be L-shaped in cross section with one leg 31 extending upright and perpendicular to the plane of the support plate 24 and being secured to the support plate 24, the other leg 32 extending horizontally and spaced downwardly from the support plate 24 to receive the horizontal leg of the support members 17 and 18 in the space between the horizontal leg 32 of the brackets 28 and 29 and the undersurface of the support plate 24. In other words, a track is defined by the brackets 28 and 29 and the undersurface of the support plate 24 to receive the horizontal leg portion of each support member 17 and 18 therein. It is to be understood that when the lateral edges 26 and 27 so engage the guide walls 22 and 23, a stop will be defined preventing further movement of the support plate 24 toward the sectors 12. However, it is desirable to provide a more positive stop to limit the movement of the support plate 24 toward the sectors 12. A pair of blocks 33 are mounted on the support plate 24 and each have a notch 34 in a side thereof facing the plate 16. The sidewalls of the notch 34 are flat and define an angle of about 90°, 45° on each side of the angle bisector which extends parallel to the radius of the table extending through the central part of the sector 12. A pair of cylindrical pins 35 are mounted on the plate 16 and are positioned to be received in the notches to prevent further movement of the support plate 24 toward the sectors 12 as shown in FIGS. 3 and 5.

A mold housing 36 is secured to the upper surface of the support plate 24 by any conventional means, not illustrated. In this particular embodiment, the mold housing 36 is spaced radially outwardly from the innermost edge of the plate 24. An upstanding hook member 37 is provided in this space and on the upper side of the plate 24. The hook member 37 has a recess 38 therein for purposes which will be explained below. In this particular embodiment, the recess 38 faces radially outwardly, namely, in a direction facing a sidewall of the mold housing 36.

A toggle lever structure 41 is mounted on the plate 16 centrally between the mounting blocks 15. The toggle lever structure 41 includes a mounting plate 42 fixedly secured to the upper surface of the plate 16. A base plate 43 is secured to the mounting plate 42 by any conventional means such as screws 44. The base plate has an upstanding lug 46 thereon having a laterally extending hole (not shown) extending therethrough. The axis of this hole is perpendicular to the bisector of the acute angle defined by the support members. An elongate first lever 47 has a bifurcated end at one end straddling the lug 46 as illustrated in FIG. 3. Each leg of the bifurcation has a hole therethrough which is axially aligned with the hole extending through the lug 46 so as to receive a pin 48 therethrough to render the lever 47 pivotal with respect to the lug 46. The end of the lever 47 remote from the pin 48 defines a handle 49.

The lever 47 has an enlarged segment 51 oriented between the bifurcation and the handle 49. A hole 52 extends laterally through the enlarged segment 51 as illustrated in FIG. 4 and pivotally receives therein an elongated cylindrical rod 53. The rod 53 has adjacent both ends thereof and on opposite sides of the lever 47 a pair of diametrically extending holes therethrough. A U-shaped lever 54 having a pair of parallel legs 56 and 57 is positioned so that the legs 56 and 57 are received in the holes extending through the cylindrical rod 53. Appropriate fasteners 58 are utilized to fixedly secure the lever 54 to the rod 53. The bight portion 59 of the U-shaped lever 54 is adapted to be received in the recess 38 of the hook member 37 when the handle 49 is pivoted to the broken line position 47A illustrated in FIG. 4. Thus, upon a movement of the lever 47 from the broken line position 47A illustrated in FIG. 4 to the solid line position, the lever 54 will, due to its connection to the lever 47, draw the mold housing support plate 24 toward the sector 12 until the pins 35 firmly engage each of the sidewalls of the notch 34 and the lateral edges 26 and 27 thereof firmly engage the guide walls 22 and 23 on each of the support members 17 and 18, respectively. However, actual engagement of the lateral edges 26 and 27 with the guide walls 22 and 23 is not a necessary requirement as the positive stop defined by the pins 35 and notch 34 will be entirely sufficient. In other words, a space can exist between the lateral edges 26 and 27 and the guide walls 22 and 23 without affecting the effectiveness of the positive stop. At this location, the lever 47 will not quite yet be at the solid line position illustrated in FIG. 4. That is, a straight line intersecting the axis of the hole in the lug 46 and the axis of the hole 52 will be oriented slightly above the axis of the hole extending through the lug 46. Continued movement of the lever 47 toward the solid line position illustrated in FIG. 4 will cause a tensioning of the legs 56 and 57 of the lever 54 to enable the straight line to pass to the opposite side of the axis of the hole extending through the lug 46 to cause the lever 47 to be firmly held in the position illustrated in FIG. 4. In other words, an over-center locking of the lever 47 occurs when the U-shaped lever 54 is in the position illustrated in FIG. 4. This secure holding of the mold housing support plate 24 will also effect a proper alignment between the inlet structure 61 to the mold cavity inside the mold housings 36 with the injection nozzle structure of an injection molding machine.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mold housing support apparatus for supporting a mold housing means, said mold housing means having a mold cavity therein, comprising:

base means;

quick connect and disconnect means for releasably securing said mold housing means to said base means, said quick connect and disconnect means including:

first and second elongate support members secured at one end to said base means and cantilevered horizontally outwardly from said base means, said support members each having a horizontal support surface, and, an upstanding guide wall so that both of said horizontal support surfaces are located between said guide walls, said guide walls further being oriented to diverge in a direction away from said base means at an acute angle;

positive stop means on said base means for limiting the extent to which said mold housing means can move toward said upstanding guide walls;

said mold housing means having a bottom wall, said mold housing means further having oppositely facing sidewall means thereon converging in a direction toward said base means parallel to said upstanding guide walls when said mold housing means is oriented adjacent said base means and between said upstanding guide walls, said mold housing means being supported on said horizontal support surfaces for movement toward and away from said positive stop means, said mold housing means having inlet means thereon adapted to be aligned with injection nozzle means on an injection molding means when said mold housing means engages said positive stop means;

an upstanding hook means fixedly mounted on said mold housing means or said base means;

toggle lever means fixedly mounted on the other of said mold housing means or said base means, said toggle lever means having an elongate first lever with a handle at one end and being pivotally supported at an opposite end to facilitate movement of said handle between first and second positions about a first axle generally perpendicular to a bisector of said acute angle defined by said diverging guide walls, and a second lever pivotally secured to said first lever for movement about a second axle at a first location thereon intermediate said first axle and said handle, said second lever having gripping means thereon adapted to grip said upstanding hook means at a second location, said first lever, when at said first position, enabling said gripping means to grip said upstanding hook means, and when approaching said second position causing a straight line extending through said first and second axles to be first oriented on one side of said first axle and effect a movement of said mold means toward said base means and a limiting engagement of said mold housing with said positive stop means to effect an alignment of said inlet means with said injection nozzle means upon a continued movement of said second lever until said straight line intersects said first axle thereby bringing said sidewall means into tighter engagement with said positive stop means so that further movement of said first lever will cause a yieldable tensioning of said second lever until said straight line passes to the opposite side of said first axle whereat said first lever will be held in said second position by the tension on said second lever.

* * * * *